US012216208B2

(12) United States Patent
Avci et al.

(10) Patent No.: US 12,216,208 B2
(45) Date of Patent: *Feb. 4, 2025

(54) TECHNIQUES FOR PROCESSING A TARGET RETURN SIGNAL USING FREE-SPACE OPTICS

(71) Applicant: Aeva, Inc., Mountain View, CA (US)

(72) Inventors: Oguzhan Avci, Cupertino, CA (US);
Omer P. Kocaoglu, Fremont, CA (US);
Neal N. Oza, Palo Alto, CA (US);
Keith Gagne, Santa Clara, CA (US);
Behsan Behzadi, Sunnyvale, CA (US);
Mina Rezk, Haymarket, VA (US)

(73) Assignee: Aeva, Inc., Mountain View, CA (US)

( * ) Notice: Subject to any disclaimer, the term of this patent is extended or adjusted under 35 U.S.C. 154(b) by 63 days.

This patent is subject to a terminal disclaimer.

(21) Appl. No.: 17/978,520

(22) Filed: Nov. 1, 2022

(65) Prior Publication Data

US 2023/0049443 A1 Feb. 16, 2023

Related U.S. Application Data

(63) Continuation of application No. 17/481,142, filed on Sep. 21, 2021, now Pat. No. 11,525,916, which is a continuation of application No. 16/415,836, filed on May 17, 2019, now Pat. No. 11,156,715.

(51) Int. Cl.
*G01C 3/08* (2006.01)
*G01S 7/4912* (2020.01)
*G01S 7/499* (2006.01)
*G01S 17/34* (2020.01)

(52) U.S. Cl.
CPC ............ *G01S 17/34* (2020.01); *G01S 7/4912* (2013.01); *G01S 7/499* (2013.01)

(58) Field of Classification Search
CPC ......... G01S 17/34; G01S 7/4912; G01S 7/499
See application file for complete search history.

(56) References Cited

U.S. PATENT DOCUMENTS

| 5,114,226 A * | 5/1992 | Goodwin ............... G01S 17/06 356/4.09 |
| 5,541,729 A | 7/1996 | Takeuchi et al. |
| 10,908,267 B1 | 2/2021 | Gagne et al. |

(Continued)

FOREIGN PATENT DOCUMENTS

| CN | 109579779 A * | 4/2019 | ............. G01B 11/26 |
| WO | 2016154780 A1 | 10/2016 | |

*Primary Examiner* — Mark Hellner
(74) *Attorney, Agent, or Firm* — Womble Bond Dickinson (US) LLP

(57) ABSTRACT

Free-space optics for use in a light detection and ranging (LIDAR) apparatus include a polarization beam-splitter (PBS) to direct an optical beam in a first direction toward a target environment and to propagate a portion of the optical beam in a second direction for receipt by a photodetector (PD), a polarization wave plate (PWP) to convert the optical beam from a first polarization to a second polarization, and to convert the target return signal from a third polarization to a fourth polarization, and a lens system coupled between the PBS and the PWP to magnify the optical beam. The propagated portion of the optical beam comprises a local oscillator (LO) signal to mix with a target return signal to generate target information.

18 Claims, 9 Drawing Sheets

(56) References Cited

U.S. PATENT DOCUMENTS

| | | | |
|---|---|---|---|
| 11,156,715 B1* | 10/2021 | Avci | G01S 7/4912 |
| 11,525,916 B2* | 12/2022 | Avci | G01S 17/86 |
| 2006/0227316 A1* | 10/2006 | Gatt | G01S 7/4811 |
| | | | 356/5.11 |
| 2017/0089829 A1* | 3/2017 | Bartholomew | G01S 7/499 |
| 2020/0088859 A1 | 3/2020 | Shepard et al. | |

\* cited by examiner

TECHNIQUES FOR PROCESSING A TARGET RETURN SIGNAL USING FREE-SPACE OPTICS

CROSS-REFERENCE TO RELATED APPLICATION

This application is a continuation of U.S. patent application Ser. No. 17/481,142 filed Sep. 21, 2021, which is a continuation of U.S. patent application Ser. No. 16/415,836 filed May 17, 2019, the entire contents of each of which are hereby incorporated by reference.

TECHNICAL FIELD

The present disclosure relates generally to light detection and ranging (LIDAR) that provides simultaneous measurement of range and velocity across two dimensions.

BACKGROUND

Fast-scanning mirrors and pulsed or frequency swept optical sources are the primary components used to illuminate a target environment in most conventional LIDAR systems. One mirror typically scans quickly along the X direction (azimuth), while another mirror scans more slowly along the Y direction (elevation). Light emission and detection from target reflections are done coaxially, typically via one or more single mode waveguides in a photonic integrated circuit or in single mode fibers. The light collected from the illuminated target has a measured delay that is used to extract range information, and a frequency shift that can be used to extract velocity information. A 3-dimensional point cloud can be established when the point-wise detected range information is combined with angular position data from the scanning mirrors. To achieve higher frame rates, the angular velocity of the scanning mirror can be increased, especially that of the scanner in the faster scan direction. When using a mirror with a high angular velocity and fiber-based detection, the target signal from distant objects is degraded. One source of signal degradation is a loss of angular accuracy due to the change in the angular position of the scanner mirror during the round-trip time of the optical signal to and from a distant target. This error is usually referred to as "insufficient de-scan" or "walk-off" A secondary source of signal degradation is due to optical aberrations which can distort/expand the return beam, reducing the coupling efficiency on the small waveguide apertures or fiber tip.

SUMMARY

The present disclosure includes, without limitation, the following examples:

One example of a light detection and ranging (LIDAR) apparatus includes an optical source configured to emit an optical beam, a photodetector configured to receive a target return signal, and free-space optics that includes a polarizing beam-splitter configured to transmit the optical beam in a first direction toward a target environment and to leak a portion of the optical beam in a second direction toward the photodetector, where the leaked portion of the optical beam serves as a local oscillator signal to mix with the target return signal to generate target information.

Another example of a LIDAR apparatus includes an optical source configured to emit an optical beam, a photodetector configured to receive a target return signal, and free-space optics that include a polarizing beam-splitter to transmit the optical beam in a first direction toward a target environment, and a polarization wave plate to transmit the optical beam toward the target environment and to reflect a portion of the optical beam to the polarizing beam-splitter, where the reflected portion of the optical beam is directed in a second direction toward the photodetector, serving as a local oscillator signal to mix with the target return signal to generate target information.

One example method in a LIDAR apparatus includes generating an optical beam from an optical source having a first linear polarization; directing the optical beam in a first direction, toward a target environment, with a polarizing beam splitter; leaking a portion of the optical beam with the first linear polarization, from the polarizing beam splitter in a second direction, toward a photodetector as a local oscillator signal; receiving, at the photodetector, the local oscillator signal and a target return signal having the first linear polarization; and mixing the target return signal with the LO signal to generate target information.

Another example method in a LIDAR apparatus includes generating an optical beam from an optical source having a first linear polarization; directing the optical beam in a first direction, toward a target environment, with a polarizing beam splitter; reflecting a portion of the optical beam as a local oscillator signal having a second linear polarization, toward the PBS from a polarization wave plate; receiving, at a photodetector, the local oscillator signal and a target return signal having the second linear polarization; and mixing the target return signal with the local oscillator signal to generate target information.

These and other aspects of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and examples, should be viewed as combinable unless the context of the disclosure clearly dictates otherwise.

It will therefore be appreciated that this Summary is provided merely for purposes of summarizing some examples so as to provide a basic understanding of some aspects of the disclosure without limiting or narrowing the scope or spirit of the disclosure in any way. Other example implementations, aspects, and advantages will become apparent from the following detailed description taken in conjunction with the accompanying figures which illustrate the principles of the described examples.

BRIEF DESCRIPTION OF THE DRAWINGS

For a more complete understanding of various examples, reference is now made to the following detailed description taken in connection with the accompanying drawings in which like identifiers correspond to like elements.

DETAILED DESCRIPTION

The present disclosure describes examples of frequency-modulated continuous-wave (FMCW) LIDAR apparatus, and example methods therein, that incorporate free-space optical components (free-space optics) coupled to an optical source, which may be a coherent or non-coherent optical source and which may be a single-beam or multi-beam optical source, implemented in a photonic integrated circuit (PIC) or with discrete components, for example. The free-space optics may include, without limitation, polarizing beam splitters, lens systems, polarization wave plates, wavelength demultiplexers, reflectors and free-space photodetectors.

The free-space optics deliver an optical beam to the target environment, and generate and mix the local oscillator signal with the target return signal on the photodetector. The free-space optics design eliminates the challenging task of integrating the aforementioned components into a photonics chip.

The free-space design also increases the collection efficiency of the target return signal and produces a higher signal-to-noise ratio (SNR) than conventional integrated designs through the use of large aperture optics and photodetectors. In general, the efficiency of combining the target return signal with the LO signal is based on the spatial overlap between the LO signal and the target return signal on the photodetector. Examples in the present disclosure address the deficiencies of a conventional integrated LIDAR system by combining the LO signal and the target return signal in free space and providing the combined signal to a large aperture photodetector. In the free space optics, the target signal interferes with the LO signal to form the combined signal. The free-space design provides a large active surface area for mixing the signals compared with conventional integrated on-chip LIDAR designs. In addition to relaxing the alignment requirements, the large active surface area compensates for the time-dependent deleterious effects of lag angle and beam aberrations typically seen in fast scanning LiDAR systems.

Figure 1:
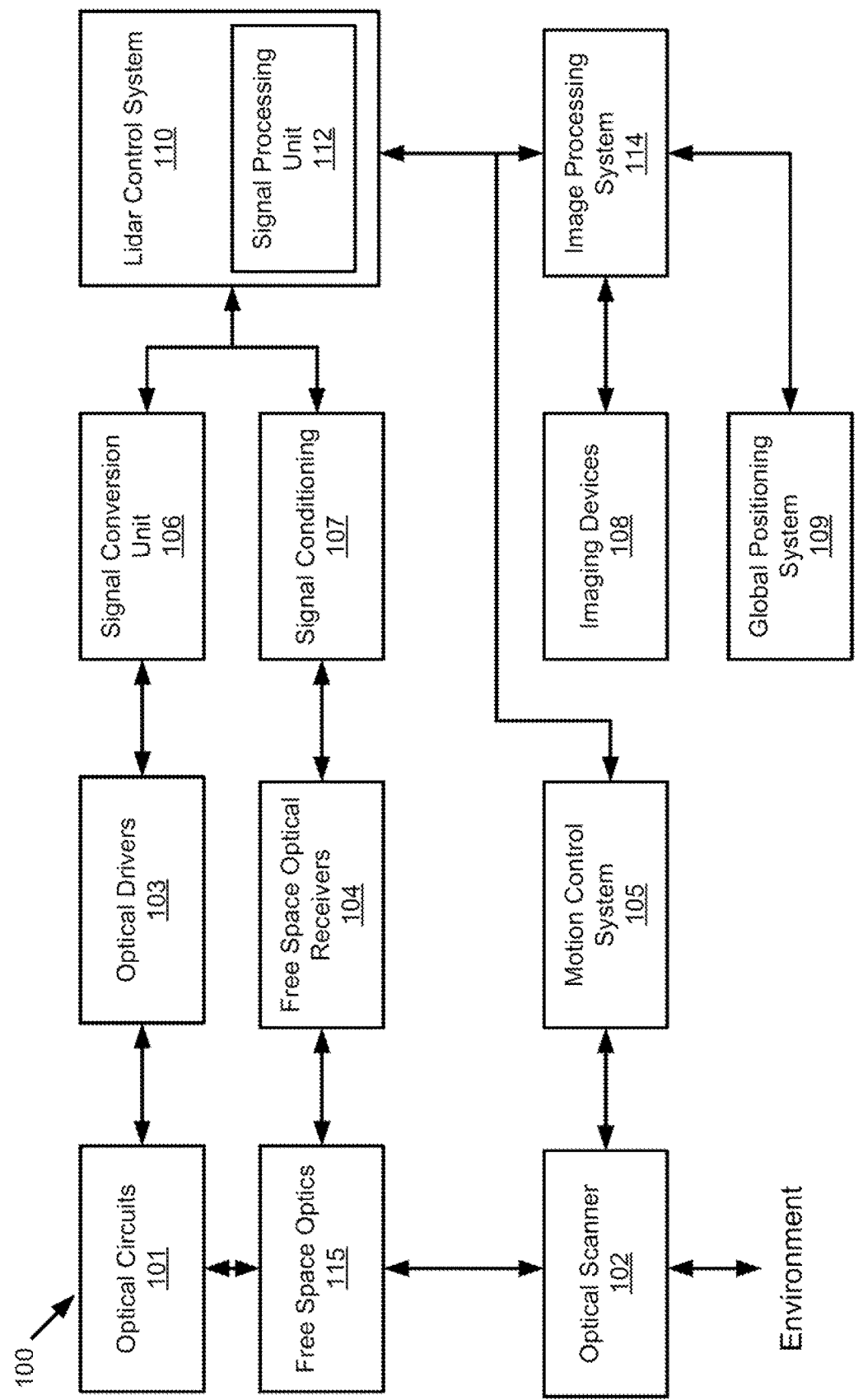
FIG. 1 is a block diagram illustrating an example LIDAR system according to the present disclosure.

FIG. 1 illustrates a LIDAR system 100 according to example implementations of the present disclosure. The LIDAR system 100 includes one or more of each of a number of components, but may include fewer or additional components than shown in FIG. 1. The LIDAR system 100 may be implemented in any sensing market, such as, but not limited to, transportation, manufacturing, metrology, medical, and security systems. For example, in the automotive industry, the described beam delivery system becomes the front-end of frequency modulated continuous-wave (FMCW) devices that can assist with spatial awareness for automated driver assist systems, or self-driving vehicles. As shown, the LIDAR system 100 includes optical circuits 101 which may be implemented on a photonics chip. The optical circuits 101 may include a combination of active optical components and passive optical components. Active optical components may generate, amplify, or detect optical signals and the like. In some examples, the active optical components may generate, amplify or detect optical beams at different wavelengths. Passive optical components may filter, attenuate, guide, reflect or alter the polarization of optical beams and the like. In some examples, passive optical components such as wavelength demultiplexers may separate optical beams of different wavelengths.

Free space optics 115 may include off-chip passive optical components such as lens systems to collimate and expand optical beams, polarizing beam splitters, polarization filters, polarization wave plates such as quarter-wave plates and half-wave plates to carry optical signals, and route and manipulate optical signals to appropriate input and output ports of the active optical circuits.

Optical scanner 102 may include one or more scanning mirrors that are rotatable along respective orthogonal axes to steer optical signals to scan a target environment according to a scanning pattern. For example, the scanning mirrors may be rotatable by one or more galvanometers. The optical scanner 102 may also collect light incident upon any objects in the environment into a return optical beam (target return signal) that is returned to the free-space optics 115. In addition to the mirrors and galvanometers, the optical scanning system may include components such as quarter-wave plates and half-wave plates, lenses, and anti-reflective coated windows or the like.

To control and support the optical circuits 101 and the optical scanner 102, the LIDAR system 100 may include a LIDAR control system 110. The LIDAR control system 110 may include a processing device for the LIDAR system 100. In some examples, the processing device may be one or more general-purpose processing devices such as a microprocessor, central processing unit, or the like. More particularly, the processing device may be a complex instruction set computing (CISC) microprocessor, reduced instruction set computer (RISC) microprocessor, very long instruction word (VLIW) microprocessor, or processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like.

In some examples, the LIDAR control system 110 may include a signal processing unit 112 such as a digital signal processor. The LIDAR control system 110 may be configured to output digital control signals to control optical drivers 103. In some examples, the digital control signals may be converted to analog signals through signal conversion unit 106. For example, the signal conversion unit 106 may include a digital-to-analog converter. The optical drivers 103 may then provide drive signals to active components of optical circuits 101 to drive optical sources such as lasers and amplifiers. In some embodiments, several optical drivers 103 and signal conversion units 106 may be provided to drive multiple optical sources.

The LIDAR control system 110 may also be configured to output digital control signals for the optical scanner 102. A motion control system 105 may control the galvanometers of the optical scanner 102 based on control signals received from the LIDAR control system 110. For example, a digital-to-analog converter may convert coordinate routing information from the LIDAR control system 110 to signals interpretable by the galvanometers in the optical scanner 102. In some examples, a motion control system 105 may also return information to the LIDAR control system 110 about the position or operation of components of the optical scanner 102. For example, an analog-to-digital converter may in turn convert information about the galvanometers' position to a signal interpretable by the LIDAR control system 110.

The LIDAR control system 110 may be further configured to analyze incoming digital signals. In this regard, the LIDAR system 100 may include optical receivers 104, such as free-space photodetectors, to measure one or more beams received by free-space optics 115. For example, a free-space photodetector may measure the amplitude of a reference beam (e.g., a local oscillator signal) from the free-space optics 115, and an analog-to-digital converter may convert signals from the optical receivers 104 to signals interpretable by the LIDAR control system 110. The optical receivers 104 may also measure the optical signal (e.g., a target return signal) that carries information about the range and velocity of a target in the form of a beat frequency between the local oscillator signal and the target return signal. The optical receivers 104 may include a high-speed analog-to-digital converter to convert signals received by the optical receivers to signals interpretable by the LIDAR control system 110.

In some examples, the LIDAR system 100 may additionally include one or more imaging devices 108 configured to capture images of the target environment, a global positioning system 109 configured to provide a geographic location of the system 100, or other sensor inputs. The LIDAR system 100 may also include an image processing system 114. The image processing system 114 may be configured to receive the images and geographic location, and send the images and location or information related thereto to the LIDAR control system 110 or other systems connected to the LIDAR system 100.

In some examples, the LIDAR system 100 may be configured to use nondegenerate optical sources to simultaneously measure range and velocity across two dimensions, providing for real-time, long range measurements of range, velocity, azimuth, and elevation of the surrounding environment. In some examples, the system may direct multiple modulated optical beams to the same target environment.

In some examples, the scanning process begins with the optical drivers 103 and LIDAR control system 110. The LIDAR control system 110 instructs the optical drivers 103 to independently modulate one or more optical beams, and these modulated signals propagate through the on-chip optical circuits, to and through the free-space optics 115. The free-space optics 115 direct the optical beams at the optical scanning system 102 that scans the target environment over a preprogrammed pattern defined by the motion control subsystem 105.

Optical signals reflected back from the target environment (the target return signals) pass through the passive free-space optics 115 to the free-space optical receivers 104. Each return signal is time-shifted in proportion to the target range, producing a constant, range-related beat frequency when mixed with the frequency modulated reference signal (local oscillator signal), which is detected on the free-space optical receivers 104. Any relative velocity component of an illuminated target (relative to the LIDAR system 100) produces an additional Doppler frequency shift, proportional to the relative target velocity, that can be distinguished from the range-related frequency offset by a signal processing unit 112 described below. The configurations of the free-space optics 115 for polarizing and directing beams to the optical receivers 104 are described in detail below.

The analog signals from the optical receivers 104 are converted to digital signals using ADCs. The digital signals are then sent to the LIDAR control system 110. A signal processing unit 112 may then receive the digital signals and interpret them. In some examples, the signal processing unit 112 also receives position data from the motion control system 105 and galvanometer (not shown) as well as image data from the image processing system 114. The signal processing unit 112 can then generate a 3D point cloud with information about range and velocity of points in the environment as the optical scanner 102 scans additional points. The signal processing unit 112 can also overlay a 3D point cloud data with the image data to determine velocity and distance of objects in the surrounding area. The system also processes the satellite-based navigation location data to provide a precise global location.

Figure 2:
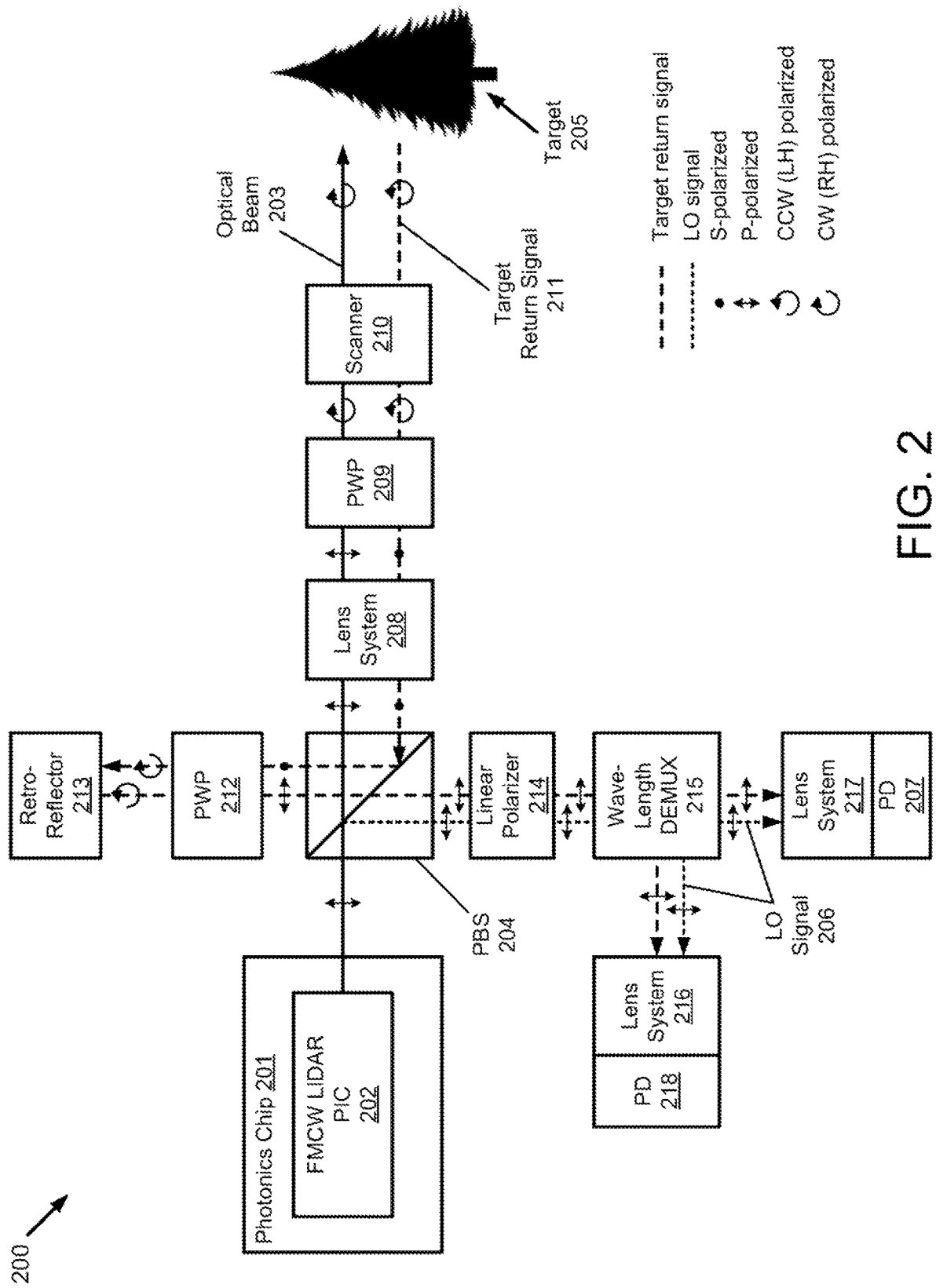
FIG. 2 is a block diagram illustrating an example single-beam LIDAR apparatus in a first configuration according to the present disclosure.

FIG. 2 is a block diagram illustrating an example single-beam LIDAR apparatus 200 in a first configuration. The configuration illustrated in FIG. 2 includes a photonics chip 201, including an FMCW LIDAR photonic integrated circuit (PIC) 202, and free-space optics. In one example, the optical circuits 101, described in respect to FIG. 1, may be implemented on photonic chip 201. The PIC 202 is configured to generate and emit an optical beam 203, which may be multi-spectral (i.e., containing more than one wavelength). The PIC 202 is optically coupled to a polarizing beam-splitter (PBS) 204. The PBS 204 transmits a p-polarization of the optical beam 203 in a first direction toward a target 205 in the target environment. The p-polarization of the optical beam 203 is the polarization of the beam that is parallel to the plane of incidence of the optical beam 203 in the PBS 204. The PBS 204 is designed to have a finite polarization extinction ratio, such that a detectable p-polarized portion 206 of the optical beam 203 is leaked by the PBS 204 in a second direction toward a photodetector 207. In one example, without limitation, the PBS 204 may have a polarization extinction ratio on the order of 1:1000. The leaked portion 206 of the optical beam 203 may be used as a local oscillator (LO) signal to mix with a target return signal as described in greater detail below.

In one example, the free-space optics may include a lens system 208 to magnify the optical beam 203. The lens system 208 may be any suitable lens system such as a Galilean or a Keplerian lens system, for example.

In one example, the free-space optics may include a polarization wave plate (PWP) 209, which may be a quarter-wave plate or half-wave plate, to convert the optical beam 203 from the first linear polarization (p-polarization) to a first circular polarization. In the example configuration of FIG. 2, the first circular polarization is shown as a right-hand (RH) or clockwise (CW) circular polarization. The circularly polarized optical beam 203 is then directed to the target environment by optical scanners 210. In the example illustrated in FIG. 2, the optical beam 203 illuminates the target 205, which reflects the optical beam as a target return signal 211. The principle component of the target return signal 211 will be a circularly polarized signal (second circular polarization) with the opposite polarization sense of the circularly polarized optical beam 203. In the example of FIG. 2, the target return signal will have a left-hand (LH) or counter-clockwise (CCW) circular polarization.

The target return signal 211 is de-scanned by the optical scanner 210 and transmitted through the PWP 209, where the polarization of the target return signal 211 is converted from the second circular polarization to an s-polarized signal (second linear polarization), perpendicular to the p-polarization (first linear polarization) of the original optical beam 203. The s-polarized target return signal 211 then passes through the lens system 208 and is reflected by the PBS 204 in a third direction to a second PWP 212, which may be a quarter-wave plate or half-wave plate, to convert the target return signal 211 from the second linear polarization (s-polarization) to the first circular polarization (RH or CW circular polarization in the example of FIG. 2). The circularly polarized target return signal 211 is then reflected by retro-reflector 213 back through the second PWP 212. The retro-reflector 211 reverses the polarization sense of the target return signal 211 from the first circular polarization (RH or CW in the example of FIG. 2) to the second circular polarization (LH or CCW in the example of FIG. 2), and the second PWP 212 converts the target return signal 211 from the second circular polarization to the first linear polarization (p-polarization in the example of FIG. 2).

The p-polarized target return signal 211 passes through PBS 204 to co-propagate with the LO signal 206 (leakage signal), where the p-polarized target return signal 211 and the p-polarized LO signal 206 pass through a linear polarizer 214. The linear polarizer passes the p-polarized light and rejects any signal that is not p-polarized, which prevents light of different polarizations from elevating the noise floor of the detection system.

For multiple wavelength beams, wavelength demultiplexers may be used to separate different wavelengths and direct them to dedicated detectors. FIG. 2 illustrates an example of a two-wavelength configuration, where a wavelength demultiplexer (DEMUX) 215 separates the first wavelength, $\lambda_1$, from the second wavelength, $\lambda_2$. The DEMUX 215 may be for example, and without limitation, a dichroic mirror, a Bragg grating or any other suitable wavelength demultiplexer. The separate wavelengths may then be focused by respective lens systems 216 and 217 onto respective photodetectors 207 and 218, where the interference between the LO signal 206 and the target return signal 211 generates target information as described above. The use of large aperture free-space optics and free-space photodetectors ensures that any beam decentering caused by insufficient de-scan does not degrade the SNR of the target return signal 211.

Figure 3:
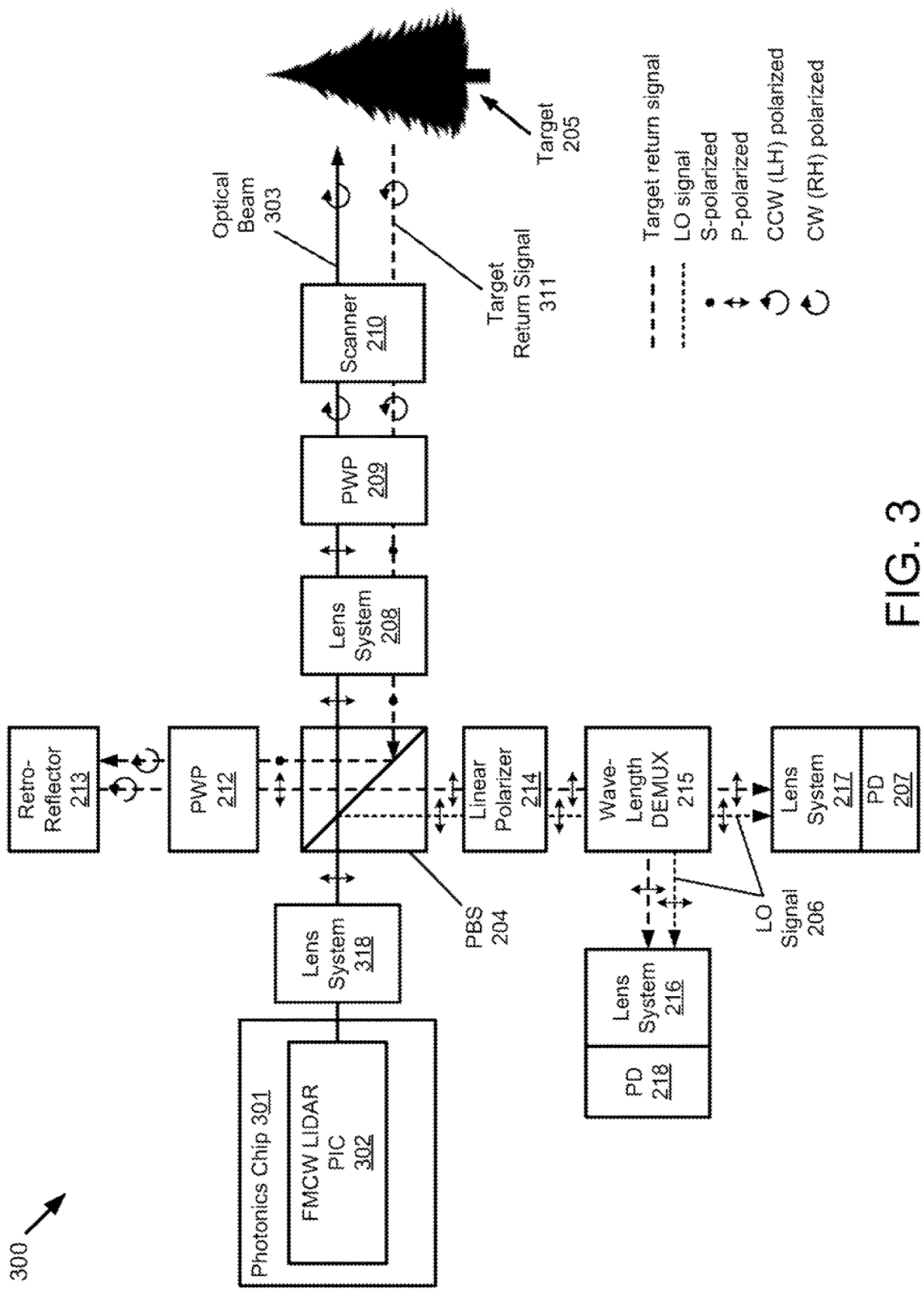
FIG. 3 is a block diagram illustrating an example multi-beam LIDAR apparatus in a first configuration according to the present disclosure.

FIG. 3 is a block diagram illustrating an example multi-beam LIDAR apparatus in a first configuration. LIDAR apparatus 300 is similar in almost all respects to LIDAR apparatus 200, except that the photonics chip 301 and the FMCW LIDAR PIC 302 are configured to emit multiple beams, where each beam may be multi-spectral. In one example, the optical circuits 101, described in respect to FIG. 1, may be implemented on photonics chip 301. As illustrated in FIG. 3, the example LIDAR apparatus 300 also includes a lens array 318 to collimate the multiple beams into a collimated optical beam 303, which is directed to the PBS 204. The PBS 204 transmits a p-polarization of the optical beam 303 in a first direction toward the target 205 in the target environment. As described above, due to the finite extinction ratio of the PBS 204, a detectable p-polarized portion 306 of the optical beam 303 is leaked by the PBS 204 in a second direction toward photodetector 207. The leaked portion 306 of the optical beam 303 may be used as a local oscillator (LO) signal to mix with a target return signal. The p-polarized optical beam 303 is then magnified by the lens system 208.

The optical beam 303 is then converted by the PWP 209 from the first linear polarization (p-polarization) to a first circular polarization. In the example configuration of FIG. 3, the first circular polarization is shown as a right-hand (RH) or clockwise (CW) circular polarization. The circularly polarized optical beam 303 is then directed to the target environment by optical scanners 210. In the example illustrated in FIG. 3, the optical beam 303 illuminates the target 205, which reflects the optical beam as a target return signal 311. The principle component of the target return signal 311 will be a circularly polarized signal (second circular polarization) with the opposite polarization sense of the circularly polarized optical beam 303. In the example of FIG. 3, the target return signal will have a left-hand (LH) or counter-clockwise (CCW) circular polarization.

The target return signal 311 is de-scanned by the optical scanner 210 and transmitted through the PWP 209, where the polarization of the target return signal 311 is converted from the second circular polarization to an s-polarized signal (second linear polarization), perpendicular to the p-polarization (first linear polarization) of the original optical beam 303. The s-polarized target return signal 311 then passes through the lens system 208 and is reflected by the PBS 204 in a third direction to a second PWP 212, to convert the target return signal 311 from the second linear polarization (s-polarization) to the first circular polarization (RH or CW circular polarization in the example of FIG. 3). The circularly polarized target return signal 311 is then reflected by retro-reflector 213, back through the second PWP 212. The retro-reflector 211 reverses the polarization sense of the target return signal 311 from the first circular polarization (RH or CW in the example of FIG. 3) to the second circular polarization (LH or CCW in the example of FIG. 3), and the second PWP 212 converts the target return signal 311 from the second circular polarization to the first linear polarization (p-polarization in the example of FIG. 3).

The p-polarized target return signal 311 passes through PBS 204 to co-propagate with the LO signal 306 (leakage signal), where the p-polarized target return signal 311 and the p-polarized LO signal 306 pass through linear polarizer 214. The linear polarizer passes the p-polarized light and rejects any signal that is not p-polarized, which prevents light of different polarizations from elevating the noise floor of the detection system.

For multiple wavelength beams, wavelength demultiplexers may be used to separate different wavelengths and direct them to dedicated detectors. FIG. 3 illustrates an example of a two wavelength configuration, where a wavelength demultiplexer 215 separates the first wavelength, $\lambda_1$, from the second wavelength, $\lambda_2$. In the multi-beam system illustrated by FIG. 3, although not shown, multiple wavelength demultiplexers may be used to spatially separate the multiple beams. The separate wavelengths may then be focused by respective lens systems 216 and 217 onto respective photodetectors 207 and 218, where the interference between the LO signal 306 and the target return signal 311 generates target information as described above. The use of large aperture free-space optics and free-space photodetectors insures that any beam decentering caused by insufficient de-scan does not degrade the SNR of the target return signal 311.

Figure 4:
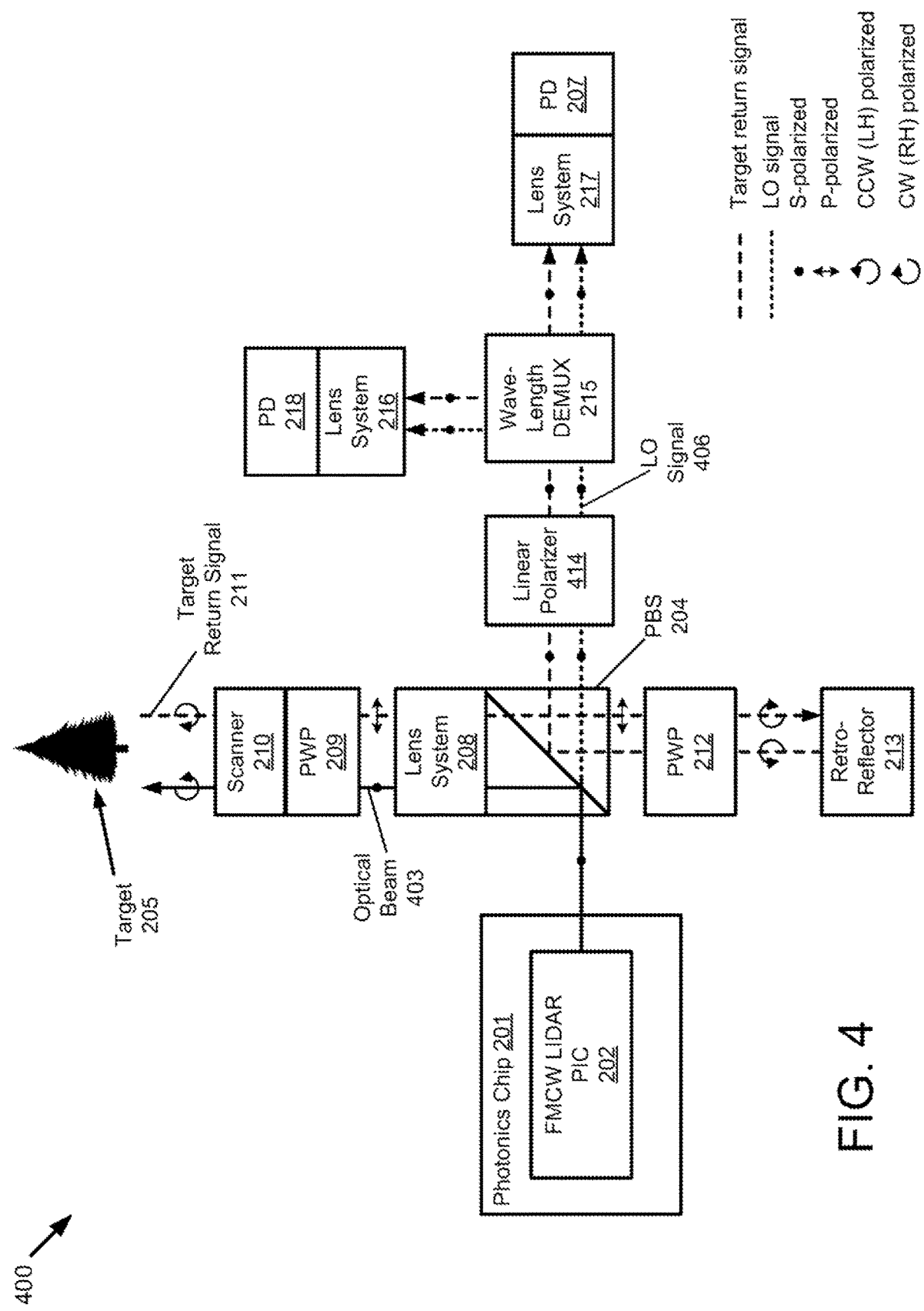
FIG. 4 is a block diagram illustrating an example single-beam LIDAR apparatus in a second configuration according to the present disclosure.

FIG. 4 is a block diagram illustrating an example single-beam LIDAR apparatus in a second configuration. The configuration illustrated in FIG. 4 is similar in many respects to the single-beam LIDAR apparatus illustrated in FIG. 2, except that the scan port of the PBS 204 and the detection port of the PBS 204 are reversed.

In FIG. 4, the LIDAR apparatus 400 includes a photonics chip 201 including an FMCW LIDAR photonic integrated circuit (PIC) 202 configured to generate and emit an optical beam 403, which may be multi-spectral. In one example, the optical circuits 101, described in respect to FIG. 1, may be implemented on photonics chip 201. The PIC 202 is optically coupled to the polarizing beam-splitter (PBS) 204. The PBS 204 reflects an s-polarization of the optical beam 403 in a first direction toward a target 205 in the target environment. The s-polarization of the optical beam 403 is the polarization of the beam that is perpendicular to the plane of incidence of the optical beam 403 in the PBS 204. The PBS 204 has a finite polarization extinction ratio, such that a detectable s-polarized portion 406 of the optical beam 403 is leaked by the PBS 204 in a second direction toward photodetector 207. The leaked portion 406 of the optical beam 403 may be used as a local oscillator (LO) signal to mix with a target return signal. In one example, the free-space optics may include a lens system 208 to magnify the optical beam 403.

The free-space optics may include a polarization wave plate (PWP) 209, to convert the optical beam 403 from the first linear polarization (s-polarization) to a first circular polarization. In the example configuration of FIG. 4, the first circular polarization is shown as a right-hand (RH) or clockwise (CW) circular polarization. The circularly polarized optical beam 403 is then directed to the target environment by optical scanners 210. In the example illustrated in FIG. 4, the optical beam 403 illuminates the target 205, which reflects the optical beam as a target return signal 411. The principle component of the target return signal 411 will be a circularly polarized signal (second circular polarization) with the opposite polarization sense of the circularly polarized optical beam 403. In the example of FIG. 4, the target return signal will have a left-hand (LH) or counter-clockwise (CCW) circular polarization.

The target return signal 411 is de-scanned by the optical scanner 210 and transmitted through the PWP 209, where the polarization of the target return signal 411 is converted from the second circular polarization to a p-polarized signal (second linear polarization), perpendicular to the s-polarization (first linear polarization) of the original optical beam 403. The p-polarized target return signal 411 then passes through the lens system 208 and is passed by the PBS 204 in a third direction to the second PWP 212, to convert the target return signal 411 from the second linear polarization (p-polarization) to the second circular polarization (LH or CCW circular polarization in the example of FIG. 4). The circularly polarized target return signal 411 is then reflected by retro-reflector 213 back through the second PWP 212. The retro-reflector 211 reverses the polarization sense of the target return signal 411 from the second circular polarization (LH or CCW in the example of FIG. 4) to the first circular polarization (RH or CW in the example of FIG. 4), and the second PWP 212 converts the target return signal 411 from the first circular polarization to the first linear polarization (s-polarization in the example of FIG. 4).

The s-polarized target return signal 411 passes through PBS 204 to co-propagate with the LO signal 406 (leakage signal), where the s-polarized target return signal 411 and the s-polarized LO signal 406 pass through a linear polarizer 414. The linear polarizer 414 passes the s-polarized light and rejects any signal that is not s-polarized, which prevents light of different polarizations from elevating the noise floor of the detection system.

For multiple wavelength beams, wavelength demultiplexers may be used to separate different wavelengths and direct them to dedicated detectors. FIG. 4 illustrates an example of a two-wavelength configuration, where a where a wavelength demultiplexer (DEMUX) 215 separates the first wavelength, $\lambda_1$, from the second wavelength, $\lambda_2$. The DEMUX 215 may be for example, and without limitation, a dichroic mirror, a Bragg grating or any other suitable wavelength demultiplexer. The separate wavelengths may then be focused by respective lens systems 216 and 217 onto respective photodetectors 207 and 218, where the interference between the LO signal 406 and the target return signal 411 generates target information as described above. The use of large aperture free-space optics and free-space photodetectors insures that any beam decentering caused by insufficient de-scan does not degrade the SNR of the target return signal 411.

Figure 5:
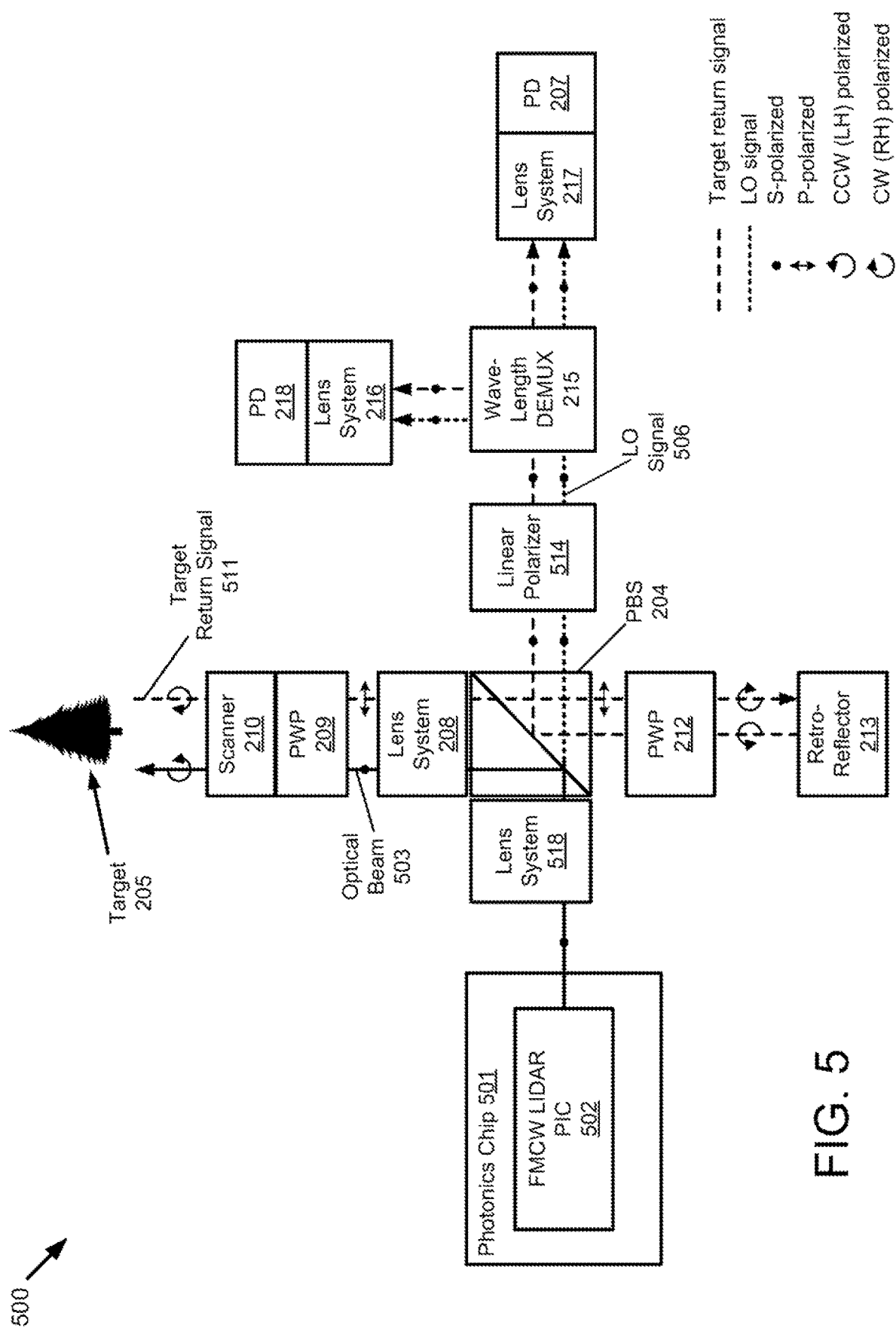
FIG. 5 is a block diagram illustrating an example multi-beam LIDAR apparatus in a second configuration according to the present disclosure.

FIG. 5 is a block diagram illustrating an example multi-beam LIDAR apparatus in a second configuration. LIDAR apparatus 500 is similar in almost all respects to LIDAR apparatus 400, except that the photonics chip 501 and the FMCW LIDAR PIC 502 are configured to emit multiple beams, where each beam may be multi-spectral. In one example, the optical circuits 101, described in respect to FIG. 1, may be implemented on photonics chip 501. As illustrated in FIG. 5, the example LIDAR apparatus 500 includes a lens array 518 to collimate the multiple beams into a collimated optical beam 503, which is directed to the PBS 204. The PBS 204 reflects an s-polarization of the optical beam 503 in a first direction toward a target 205 in the target environment. The s-polarization of the optical beam 503 is the polarization of the beam that is perpendicular to the plane of incidence of the optical beam 503 in the PBS 204. The PBS 204 has a finite polarization extinction ratio, such that an s-polarized portion 506 of the optical beam 503 is leaked by the PBS 204 in a second direction toward photodetector 207. The leaked portion 506 of the optical beam 503 may be used as a local oscillator (LO) signal to mix with a target return signal. The free-space optics may include a lens system 208 to magnify the optical beam 503.

The free-space optics may include a polarization wave plate (PWP) 209, to convert the optical beam 503 from the first linear polarization (s-polarization) to a first circular polarization. In the example configuration of FIG. 5, the first circular polarization is shown as a right-hand (RH) or clockwise (CW) circular polarization. The circularly polarized optical beam 503 is then directed to the target environment by optical scanners 210. In the example illustrated in FIG. 5, the optical beam 503 illuminates the target 205, which reflects the optical beam as a target return signal 511. The principle component of the target return signal 511 will be a circularly polarized signal (second circular polarization) with the opposite polarization sense of the circularly polarized optical beam 503. In the example of FIG. 5, the target return signal will have a left-hand (LH) or counter-clockwise (CCW) circular polarization.

The target return signal 511 is de-scanned by the optical scanner 210 and transmitted through the PWP 209, where the polarization of the target return signal 511 is converted from the second circular polarization to a p-polarized signal (second linear polarization), perpendicular to the s-polarization (first linear polarization) of the original optical beam 503. The p-polarized target return signal 511 then passes through the lens system 208 and is passed by the PBS 204 in a third direction to the second PWP 212, to convert the target return signal 511 from the second linear polarization (p-polarization) to the second circular polarization (LH or CCW circular polarization in the example of FIG. 4). The circularly polarized target return signal 511 is then reflected by retro-reflector 213 back through the second PWP 212. The retro-reflector 211 reverses the polarization sense of the target return signal 511 from the second circular polarization (LH or CCW in the example of FIG. 5) to the first circular polarization (RH or CW in the example of FIG. 5), and the second PWP 212 converts the target return signal 511 from the first circular polarization to the first linear polarization (s-polarization in the example of FIG. 5).

The s-polarized target return signal 511 passes through PBS 204 to co-propagate with the LO signal 506 (leakage signal), where the s-polarized target return signal 511 and the s-polarized LO signal 506 pass through a linear polarizer 514. The linear polarizer 514 passes the s-polarized light and rejects any signal that is not s-polarized, which prevents light of different polarizations from elevating the noise floor of the detection system.

For multiple wavelength beams, wavelength demultiplexers may be used to separate different wavelengths and direct them to dedicated detectors. FIG. 5 illustrates an example of a two-wavelength configuration, where a where a wavelength demultiplexer (DEMUX) 215 separates the first wavelength, $\lambda_1$, from the second wavelength, $\lambda_2$. The DEMUX 215 may be for example, and without limitation, a dichroic mirror, a Bragg grating or any other suitable wavelength demultiplexer. In the multi-beam system illustrated by FIG. 5, although not shown, multiple wavelength demultiplexers may be used to spatially separate the multiple beams. The separate wavelengths may then be focused by respective lens systems 216 and 217 onto respective photodetectors 207 and 218, where the interference between the LO signal 506 and the target return signal 511 generates target information as described above. The use of large aperture free-space optics and free-space photodetectors insures that any beam decentering caused by insufficient de-scan does not degrade the SNR of the target return signal 511.

Figure 6:
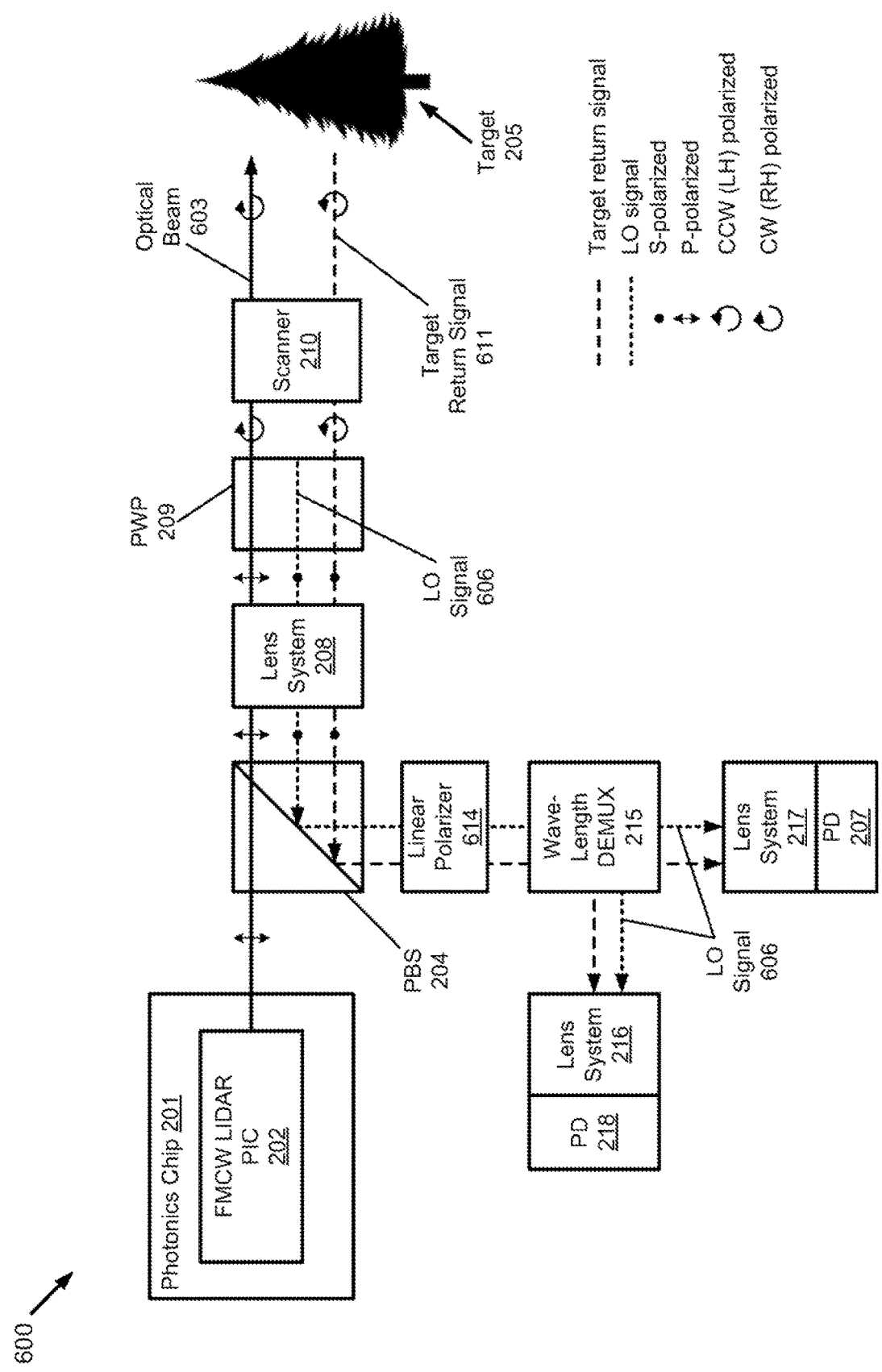
FIG. 6 is a block diagram illustrating an example single-beam LIDAR apparatus in a third configuration according to the present disclosure.

FIG. 6 is a block diagram illustrating an example single-beam LIDAR apparatus in a third configuration. The LIDAR apparatus 600 illustrated in FIG. 6 includes a photonics chip 201, including an FMCW LIDAR photonic integrated circuit (PIC) 202, and free-space optics. In one example, the optical circuits 101, described in respect to FIG. 1, may be implemented on photonics chip 201. The PIC 202 is configured to generate and emit an optical beam 603, which may be multi-spectral (i.e., containing more than one wavelength). The PIC 202 is optically coupled to a polarizing beam-splitter (PBS) 204. The PBS 204 transmits a p-polarization of the optical beam 603 in a first direction toward a target 205 in the target environment. In one example, the free-space optics may include a lens system 208 to magnify the optical beam 603.

In one example, the free-space optics includes a polarization wave plate (PWP) 209, which may be a quarter-wave plate or half-wave plate, to convert the optical beam 603 from the first linear polarization (p-polarization) to a first circular polarization. In the example configuration of FIG. 6, the first circular polarization is shown as a right-hand (RH) or clockwise (CW) circular polarization. The circularly polarized optical beam 603 is then directed to the target environment by optical scanners 210.

The PWP 209 is designed to partially reflect and change the polarization of the p-polarized optical beam 603, such that a detectable s-polarized portion 606 of the optical beam 603 is reflected back through the lens system 208 to the PBS 204, where it is reflected in a second direction toward PD 207, and where it may be used as a local oscillator (LO) signal to mix with a target return signal as described below.

Continuing with the example illustrated in FIG. 6, the circularly polarized optical beam 603 illuminates the target 205, which reflects the optical beam as a target return signal 611. The principle component of the target return signal 611 will be a circularly polarized signal (second circular polarization) with the opposite polarization sense of the circularly polarized optical beam 603. In the example of FIG. 6, the target return signal will have a left-hand (LH) or counter-clockwise (CCW) circular polarization.

The target return signal 611 is de-scanned by the optical scanner 210 and transmitted through the PWP 209, where the polarization of the target return signal 611 is converted from the second circular polarization to an s-polarized signal (second linear polarization), perpendicular to the p-polarization (first linear polarization) of the original optical beam 603. The s-polarized target return signal 611 then passes through the lens system 208 and is reflected by the PBS 204 in the second direction to co-propagate with the LO signal 606 (reflected signal), where the s-polarized target return signal 611 and the s-polarized LO signal 606 pass through a linear polarizer 614. The linear polarizer passes the s-polarized light and rejects any signal that is not s-polarized, which prevents light of different polarizations from elevating the noise floor of the detection system.

For multiple wavelength beams, wavelength demultiplexers may be used to separate different wavelengths and direct them to dedicated detectors. FIG. 6 illustrates an example of a two-wavelength configuration, where a where a wavelength demultiplexer (DEMUX) 215 separates the first wavelength, $\lambda_1$, from the second wavelength, $\lambda_2$. The DEMUX 215 may be for example, and without limitation, a dichroic mirror, a Bragg grating or any other suitable wavelength demultiplexer. The separate wavelengths may then be focused by respective lens systems 216 and 217 onto respective photodetectors 207 and 218, where the interference between the LO signal 606 and the target return signal 611 generates target information as described above. The use of large aperture free-space optics and free-space photodetectors insures that any beam decentering caused by insufficient de-scan does not degrade the SNR of the target return signal 611.

Figure 7:
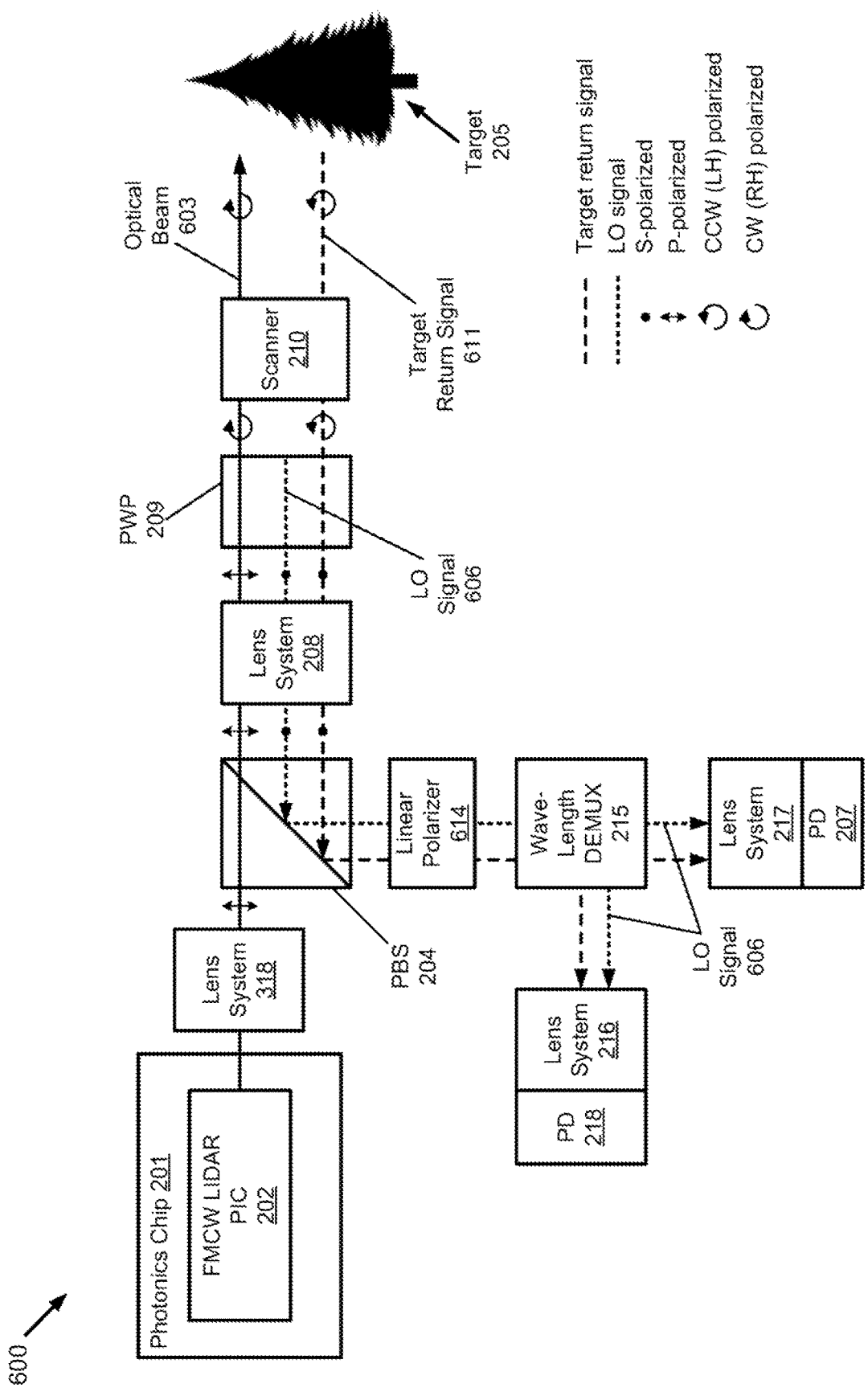
FIG. 7 is a block diagram illustrating an example multi-beam LIDAR apparatus in a third configuration according to the present disclosure.

FIG. 7 is a block diagram illustrating an example multi-beam LIDAR apparatus in a third configuration. LIDAR apparatus 700 is similar in almost all respects to LIDAR apparatus 600, except that the photonics chip 701 and the FMCW LIDAR PIC 702 are configured to emit multiple beams, where each beam may be multi-spectral. In one example, the optical circuits 101, described in respect to FIG. 1, may be implemented on photonics chip 701. As illustrated in FIG. 7, the example LIDAR apparatus 700 includes a lens array 718 to collimate the multiple beams into a collimated optical beam 703, which is directed to the PBS 204. The PBS 204 transmits a p-polarization of the optical beam 703 in a first direction toward a target 205 in the target environment. As described above, the free-space optics may include a lens system 208 to magnify the optical beam 703.

In one example, the free-space optics include a polarization wave plate (PWP) 209, which may be a quarter-wave plate or half-wave plate, to convert the optical beam 703 from the first linear polarization (p-polarization) to a first circular polarization. In the example configuration of FIG. 7, the first circular polarization is shown as a right-hand (RH) or clockwise (CW) circular polarization. The circularly polarized optical beam 703 is then directed to the target environment by optical scanners 210.

The PWP 209 is designed to partially reflect and change the polarization of the p-polarized optical beam 703, such that a detectable s-polarized portion 706 of the optical beam 703 is reflected back through the lens system 208 to the PBS 204, where it is reflected in a second direction toward PD 207, and where it may be used as a local oscillator (LO) signal to mix with a target return signal as described below.

Continuing with the example illustrated in FIG. 7, the circularly polarized optical beam 703 illuminates the target 205, which reflects the optical beam as a target return signal 711. The principle component of the target return signal 711 will be a circularly polarized signal (second circular polarization) with the opposite polarization sense of the circularly polarized optical beam 603. In the example of FIG. 7, the target return signal will have a left-hand (LH) or counter-clockwise (CCW) circular polarization.

The target return signal 711 is de-scanned by the optical scanner 210 and transmitted through the PWP 209, where the polarization of the target return signal 711 is converted from the second circular polarization to an s-polarized signal (second linear polarization), perpendicular to the p-polarization (first linear polarization) of the original optical beam 703. The s-polarized target return signal 711 then passes through the lens system 208 and is reflected by the PBS 204 in the second direction to co-propagate with the LO signal 706 (reflected signal), where the s-polarized target return signal 711 and the s-polarized LO signal 706 pass through a linear polarizer 714. The linear polarizer passes the s-polarized light and rejects any signal that is not s-polarized, which prevents light of different polarizations from elevating the noise floor of the detection system.

For multiple wavelength beams, wavelength demultiplexers may be used to separate different wavelengths and direct them to dedicated detectors. FIG. 6 illustrates an example of a two-wavelength configuration, where a where a wavelength demultiplexer (DEMUX) 215 separates the first wavelength, $\lambda_1$, from the second wavelength, $\lambda_2$. The DEMUX 215 may be for example, and without limitation, a dichroic mirror, a Bragg grating or any other suitable wavelength demultiplexer. In the multi-beam system illustrated by FIG. 7, although not shown, multiple wavelength demultiplexers may be used to spatially separate the multiple beams. The separate wavelengths may then be focused by respective lens systems 216 and 217 onto respective photodetectors 207 and 218, where the interference between the LO signal 706 and the target return signal 711 generates target information as described above. The use of large aperture free-space optics and free-space photodetectors insures that any beam decentering caused by insufficient de-scan does not degrade the SNR of the target return signal 711.

Figure 8:
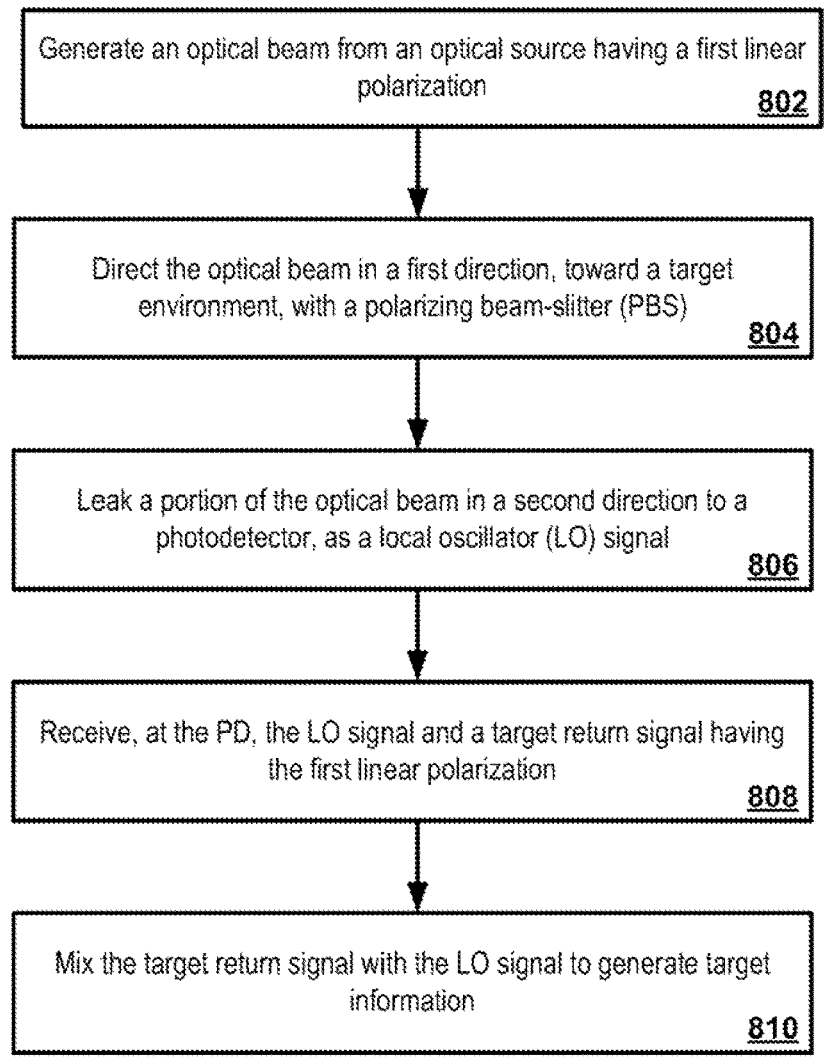
FIG. 8 is a flow diagram illustrating an example method in a LIDAR apparatus according to the present disclosure.

FIG. 8 is a flow diagram illustrating an example method 800 in a LIDAR apparatus, according to the present disclosure. Various portions of method 800 may be performed by LIDAR apparatus 200, 300, 400 and 500, illustrated in FIGS. 2, 3, 4 and 5, respectively and described in detail above.

With reference to FIG. 8, method 800 illustrates example functions used by various embodiments. Although specific function blocks ("blocks") are disclosed in method 800, such blocks are examples. That is, embodiments are well suited to performing various other blocks or variations of the blocks recited in method 800. It is appreciated that the blocks in method 800 may be performed in an order different than presented, and that not all of the blocks in method 800 may be performed.

At block 802, an optical source of a LIDAR apparatus generates an optical beam having a first linear polarization. In various examples, the optical light source may be any of photonic ICs 202, 302 and 502 as described with respect to FIGS. 2-5. The optical sources may generate multiple beams, and each beam may have multiple wavelengths. In various examples the linear polarization may be p-polarization or s-polarization with respect to a PBS that receives the optical beam.

At block 804, the optical beam is directed by a PBS in the direction of a target environment. In some examples, the optical beam may be p-polarized, and the PBS passes the optical beam toward the target environment, as illustrated and described with respect to LIDAR apparatus 200 and 300 in FIGS. 2 and 3, respectively. In other examples, the optical beam may be s-polarized, and the PBS may reflect the optical beam toward the target environment, as illustrated and describes with respect to LIDAR apparatus 400 and 500 in FIGS. 4 and 5, respectively.

At block 806, a portion of the optical beam is leaked from the PBS in the direction of a photodetector (PD) as an LO signal. In some examples, the optical beam may be p-polarized, and the PBS reflects the leaked portion of the optical beam toward the PD, as illustrated and described with respect to LIDAR apparatus 200 and 300 in FIGS. 2 and 3, respectively. In other examples, the optical beam may be s-polarized, and the PBS passes the leaked portion of the optical beam toward the PD, as illustrated and described with respect to LIDAR apparatus 400 and 500 in FIGS. 4 and 5, respectively.

At block 808, the LO signal and the target return signal are received at the PD with the same polarization. In some examples, the two signals may both be p-polarized as illustrated and described with respect to LIDAR apparatus 200 and 300 in FIGS. 2 and 3, respectively. In other examples, both signals may be s-polarized as illustrated and described with respect to LIDAR apparatus 400 and 500 in FIGS. 4 and 5, respectively.

At block 810, the LO signal and the target return signal are mixed to generate target information. The mixing may occur at the PD or anywhere along the optical path where the two signals are co-propagating with the same polarization.

Figure 9:
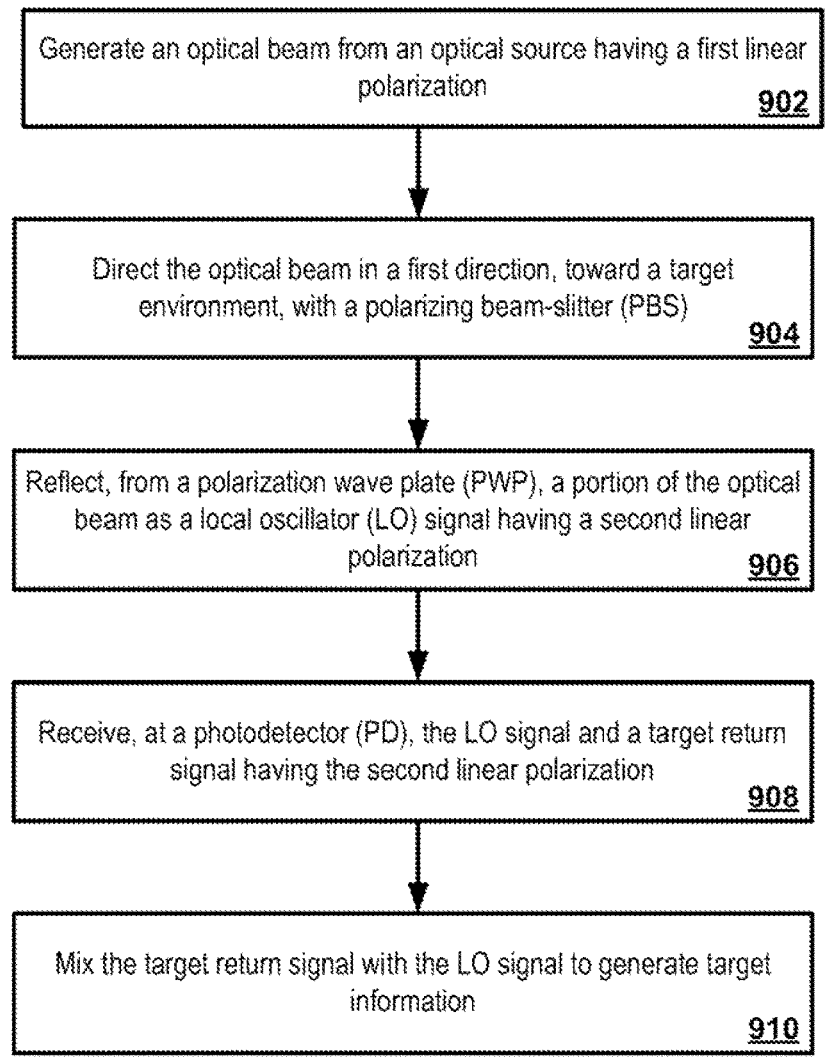
FIG. 9 is a flow diagram illustrating another example method in a LIDAR apparatus according to the present disclosure.

FIG. 9 is a flow diagram illustrating an example method 900 in a LIDAR apparatus, according to the present disclosure. Various portions of method 900 may be performed by LIDAR apparatus 600 and 700, illustrated in FIGS. 6 and 7, respectively, and described in detail above.

With reference to FIG. 9, method 900 illustrates example functions used by various embodiments. Although specific function blocks ("blocks") are disclosed in method 800, such blocks are examples. That is, embodiments are well suited to performing various other blocks or variations of the blocks recited in method 900. It is appreciated that the blocks in method 900 may be performed in an order different than presented, and that not all of the blocks in method 800 may be performed.

At block 902, an optical source of a LIDAR apparatus generates an optical beam having a first linear polarization. In various examples, the optical light source may be either of photonic ICs 202 and 702 as described with respect to FIGS. 6 and 7, respectively. The optical sources may generate multiple beams, and each beam may have multiple wavelengths. In various examples the linear polarization may be p-polarization or s-polarization with respect to a PBS that receives the optical beam.

At block 904, the optical beam is directed by a PBS in the direction of a target environment. In the examples of FIGS. 6 and 7, the optical beam is p-polarized, and the PBS passes the optical beam toward the target environment. It will be appreciated, however, that the target port and the detection port of apparatus 600 and 700 may be interchanged, to provide for the use of s-polarization in the optical beam generated by PICs 202 or 702, in which case an s-polarized optical beam would be reflected toward the target environment by the PBS.

At block 906, a portion of the optical beam is reflected from a PWB to generate an LO signal with a second linear polarization. In the examples of LIDAR apparatus 600 and 700 in FIGS. 6 and 7, the second polarization is illustrated as s-polarization. As illustrated in FIGS. 6 and 7, the LO signal co-propagates with a target return signal of the same polarization all the way back to the PD.

At block 908, the LO signal and the target return signal are received at the PD with the same polarization after co-propagating through apparatus 600 and 700 from the PWP to the PD, as illustrated in FIGS. 6 and 7, respectively.

At block 910, the LO signal and the target return signal are mixed to generate target information. The mixing may occur at the PD or anywhere along the optical path where the two signals are co-propagating with the same polarization.

The preceding description sets forth numerous specific details such as examples of specific systems, components, methods, and so forth, in order to provide a good understanding of the present disclosure. It will be apparent to one skilled in the art, however, that other examples may be practiced without these specific details. In other instances, well-known components or methods are not described in detail or are presented in simple block diagram form in order to avoid unnecessarily obscuring the present disclosure. Thus, the specific details set forth are merely non-limiting examples.

Although the operations of the methods herein are shown and described in a particular order, the order of the operations of each method may be altered so that certain operations may be performed in an inverse order or so that certain operation may be performed, at least in part, concurrently with other operations. In other examples, instructions or sub-operations of distinct operations may be performed in an intermittent or alternating manner.

The above description of illustrated examples of the invention, including what is described in the Abstract, is not intended to be exhaustive or to limit the invention to the precise forms disclosed. While specific examples are described herein for illustrative purposes, various equivalent modifications are possible within the scope of the disclosure, as those skilled in the relevant art will recognize. The word "example" or is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this disclosure, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Furthermore, the terms "first," "second," "third," "fourth," etc. as used herein are meant as labels to distinguish among different elements and may not necessarily have an ordinal meaning according to their numerical designation.

What is claimed is:

1. Free-space optics for use in a light detection and ranging (LIDAR) apparatus, comprising:
a first photodetector (PD);
a second PD;
a polarization beam-splitter (PBS) to direct an optical beam in a first direction toward a target environment and to propagate a portion of the optical beam in a second direction for receipt by the first or second photodetector, wherein the propagated portion of the optical beam comprises a local oscillator (LO) signal to mix with a target return signal to generate target information;
a wavelength demultiplexer coupled between the PBS and the first and second PDs, the wavelength demultiplexer to separate a portion of the target return signal comprising light of a first wavelength to the first PD or the second PD;
a polarization wave plate (PWP) to convert the optical beam from a first polarization to a second polarization, and to convert the target return signal from a third polarization to a fourth polarization; and
a lens system coupled between the PBS and the PWP to magnify the optical beam.

2. The free-space optics of claim 1, wherein the first polarization is a first linear polarization and the second polarization is a second circular polarization, and
wherein the third polarization is a third circular polarization and the fourth polarization is a fourth linear polarization.

3. The free-space optics of claim 1, wherein the PWP is a first PWP, and
wherein the free-space optics further comprise:
a second PWP to convert the target return signal from the fourth polarization to the second polarization; and
a reflector to convert the target return signal from the second polarization to the third polarization, and to reflect the target return signal through the second PWP.

4. The free-space optics of claim 1, wherein the free-space optics further comprise a polarization filter coupled between the PBS and the first and second PDs.

5. The free-space optics of claim 1, wherein the lens system is a first lens system,
wherein the optical beam comprises a plurality of beams, and
wherein the free-space optics further comprise a second lens system coupled between an optical source of the LIDAR apparatus and the PBS to collimate the optical beam.

6. The free-space optics of claim 1, wherein the LIDAR apparatus is a frequency-modulated continuous-wave (FMCW) LIDAR apparatus.

7. A light detection and ranging (LIDAR) apparatus, comprising:
an optical source to emit an optical beam; and
free-space optics coupled with the optical source, comprising:
a first photodetector (PD);
a second PD a polarizing beam-splitter (PBS) to direct the optical beam in a first direction toward a target environment;

a polarization wave plate (PWP) to direct the optical beam toward the target environment and to reflect a portion of the optical beam to the PBS for receipt by the PD, and wherein the reflected portion of the optical beam comprises a local oscillator signal (LO) to mix with a target return signal to generate target information;

a wavelength demultiplexer coupled between the PBS and the first and second PDs, the wavelength demultiplexer to separate a portion of the target return signal comprising light of a first wavelength to the first PD or the second PD; and a lens system coupled between the PBS and the PWP to magnify the optical beam.

8. The LIDAR apparatus of claim 7, wherein the optical beam emitted from the optical source has a first polarization and the reflected portion of the optical beam has a second polarization, the PWP to convert the optical beam from the first polarization to a third polarization and to convert the target return signal from a fourth polarization to the second polarization.

9. The LIDAR apparatus of claim 8, wherein the first polarization is a first linear polarization, the second polarization is a second linear polarization, the third polarization is a third circular polarization, and the fourth polarization is a fourth circular polarization.

10. The LIDAR apparatus of claim 7, wherein the free-space optics further comprise a polarization filter coupled between the PBS and the first and second PDs.

11. The LIDAR apparatus of claim 7, wherein the lens system is a first lens system, wherein the optical beam comprises a plurality of beams, and wherein the free-space optics further comprise a second lens system coupled between the optical source and the PBS to collimate the optical beam.

12. The LIDAR apparatus of claim 7, further comprising an optical scanner, coupled with the PWP to illuminate the target environment, wherein a detection aperture of the PD is larger than a diameter of the target return signal plus a de-scan error contributed by the optical scanner.

13. A method for light detection and ranging (LIDAR) with free-space optics, comprising:

generating an optical beam from an optical source having a first polarization;

directing the optical beam in a first direction, toward a polarizing beam splitter (PBS);

propagating a first portion of the optical beam with the first polarization from the PBS as a local oscillator (LO) signal;

separating a portion of the LO signal comprising light of a first wavelength utilizing a wavelength demultiplexer; and directing the portion of the LO signal comprising the light of the first wavelength to a first photodetector (PD) or a second PD;

directing a second portion of the optical beam from the PBS through a lens system to a polarization wave plate (PWP) to convert the second portion of the optical beam from the first polarization to a second polarization;

receiving a target return signal from a target environment at the PWP to convert the target return signal from a third polarization to a fourth polarization;

receiving, at the PBS through the lens system, the target return signal having the fourth polarization;

receiving, at the first PD or the second PD, the portion of the LO signal and a portion of the target return signal; and mixing the portion of the target return signal with the portion of the LO signal to generate target information.

14. The method of claim 13, further comprising:

removing optical noise at the PD with a polarization filter at the PD;

maximizing a signal-to-noise ratio of the target return signal with a PD aperture approximately equal to an optical aperture of the free-space optics; and minimizing a de-scan error with the PD aperture.

15. The method of claim 13, wherein the first polarization is a first linear polarization and the second polarization is a second circular polarization, and wherein the third polarization is a third circular polarization and the fourth polarization is a fourth linear polarization.

16. The method of claim 13, wherein the PWP is a first PWP, and wherein the method further comprises:

converting the target return signal from the fourth polarization to the second polarization with a second PWP; and reflecting the target return signal, with a reflector, through the PBS, wherein the target return signal is converted from the second polarization to the first polarization.

17. The method of claim 13, wherein the PD is a first PD, and wherein the method further comprises:

separating a portion of the target return signal comprising light of a first wavelength utilizing a wavelength demultiplexer; and directing the portion of the target return signal comprising the light of the first wavelength to the first PD or a second PD.

18. The method of claim 13, wherein the optical source is a frequency-modulated continuous-wave (FMCW) photonic integrated circuit (PIC).

* * * * *